(12) United States Patent
Mada et al.

(10) Patent No.: US 12,438,772 B2
(45) Date of Patent: *Oct. 7, 2025

(54) SELF-OPTIMIZING NETWORKS

(71) Applicant: DISH Wireless L.L.C., Englewood, CO (US)

(72) Inventors: Praveen Kumar Reddy Mada, Denver, CO (US); Vinayak Sharma, Denver, CO (US); Hamza Nasir Khokhar, Denver, CO (US)

(73) Assignee: DISH Wireless L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/657,634

(22) Filed: May 7, 2024

(65) Prior Publication Data

US 2024/0372777 A1  Nov. 7, 2024

Related U.S. Application Data

(63) Continuation of application No. 18/144,024, filed on May 5, 2023, now Pat. No. 12,009,974.

(51) Int. Cl.
*H04L 41/0816* (2022.01)
*H04L 41/0895* (2022.01)
(Continued)

(52) U.S. Cl.
CPC ...... *H04L 41/0816* (2013.01); *H04L 41/0895* (2022.05); *H04L 41/16* (2013.01); *H04L 47/83* (2022.05)

(58) Field of Classification Search
None
See application file for complete search history.

(56) References Cited

U.S. PATENT DOCUMENTS

| 9,400,731 B1 | 7/2016 | Preece |
| 9,438,529 B1 | 9/2016 | Kowalski |

(Continued)

FOREIGN PATENT DOCUMENTS

| CN | 110741390 A | * | 1/2020 | ............ G06N 20/00 |
| WO | WO 2022090803 | | 5/2022 | |

OTHER PUBLICATIONS

International Search Report and Written Opinion in International Appln. No. PCT/US2024/025565, mailed on Jul. 8, 2024, 14 pages.

*Primary Examiner* — Phyllis A Book
(74) *Attorney, Agent, or Firm* — Fish & Richardson P.C.

(57) ABSTRACT

Methods, systems, and apparatus, including computer programs encoded on computer-storage media, for self-optimizing networks. In some implementations, a method for self-optimizing networks includes obtaining information indicating performance metrics of a first set of computing resources of a distributed system; generating information representing usage of a wireless network at a first point in time; providing the information to a machine learning model trained to predict network events at a time subsequent to the first point in time; determining that at least one particular network event predicted in the output is addressable by using a second set of computing resources of the distributed system; transmitting a signal configured to adjust the distributed computing system to deploy the second set of computing resources.

20 Claims, 3 Drawing Sheets

(51) Int. Cl.
*H04L 41/16* (2022.01)
*H04L 47/83* (2022.01)

(56) References Cited

U.S. PATENT DOCUMENTS

| | | | |
|---|---|---|---|
| 10,613,962 B1* | 4/2020 | Delange | G06N 7/01 |
| 11,063,881 B1 | 7/2021 | Vijaysuganthan | |
| 11,245,640 B1 | 2/2022 | Maurya | |
| 11,689,940 B2 | 6/2023 | Wang et al. | |
| 11,690,089 B2 | 6/2023 | Ravuri et al. | |
| 11,695,598 B2 | 7/2023 | Ananda et al. | |
| 11,695,646 B1 | 7/2023 | Lin | |
| 12,009,974 B1 | 6/2024 | Mada et al. | |
| 2015/0026348 A1 | 1/2015 | Siddiqui | |
| 2016/0323195 A1* | 11/2016 | Rose | H04L 41/00 |
| 2017/0272317 A1 | 9/2017 | Singla et al. | |
| 2019/0250949 A1 | 8/2019 | Chen | |
| 2019/0295012 A1 | 9/2019 | Marinescu | |
| 2020/0409761 A1 | 12/2020 | Stuntebeck | |
| 2021/0073680 A1* | 3/2021 | Garvey | G06N 20/00 |
| 2021/0181739 A1 | 6/2021 | Chen | |
| 2021/0312277 A1 | 10/2021 | Prabhudesai | |
| 2021/0389894 A1 | 12/2021 | Zhou et al. | |
| 2022/0060526 A1* | 2/2022 | Jónsson | H04L 67/306 |
| 2022/0100187 A1* | 3/2022 | Isik | G06N 3/08 |
| 2022/0114401 A1* | 4/2022 | Cmielowski | G06F 18/2185 |
| 2022/0116455 A1 | 4/2022 | Raghunath | |
| 2022/0172037 A1 | 6/2022 | Kang et al. | |
| 2022/0217610 A1 | 7/2022 | Zheng | |
| 2022/0383324 A1 | 12/2022 | Sheshadri | |
| 2022/0413931 A1 | 12/2022 | Chiang | |
| 2023/0129390 A1* | 4/2023 | Fusco | G06N 5/01 |
| | | | 706/12 |
| 2023/0214308 A1* | 7/2023 | Chen | G06F 9/505 |
| | | | 718/104 |
| 2023/0251933 A1* | 8/2023 | Sidhu | G06N 3/082 |
| | | | 706/12 |
| 2023/0342658 A1 | 10/2023 | Tripathi | |
| 2023/0350717 A1 | 11/2023 | Neate | |
| 2024/0242160 A1* | 7/2024 | Ananth | G06Q 10/06393 |
| 2024/0291724 A1* | 8/2024 | Saha | H04L 41/16 |

* cited by examiner

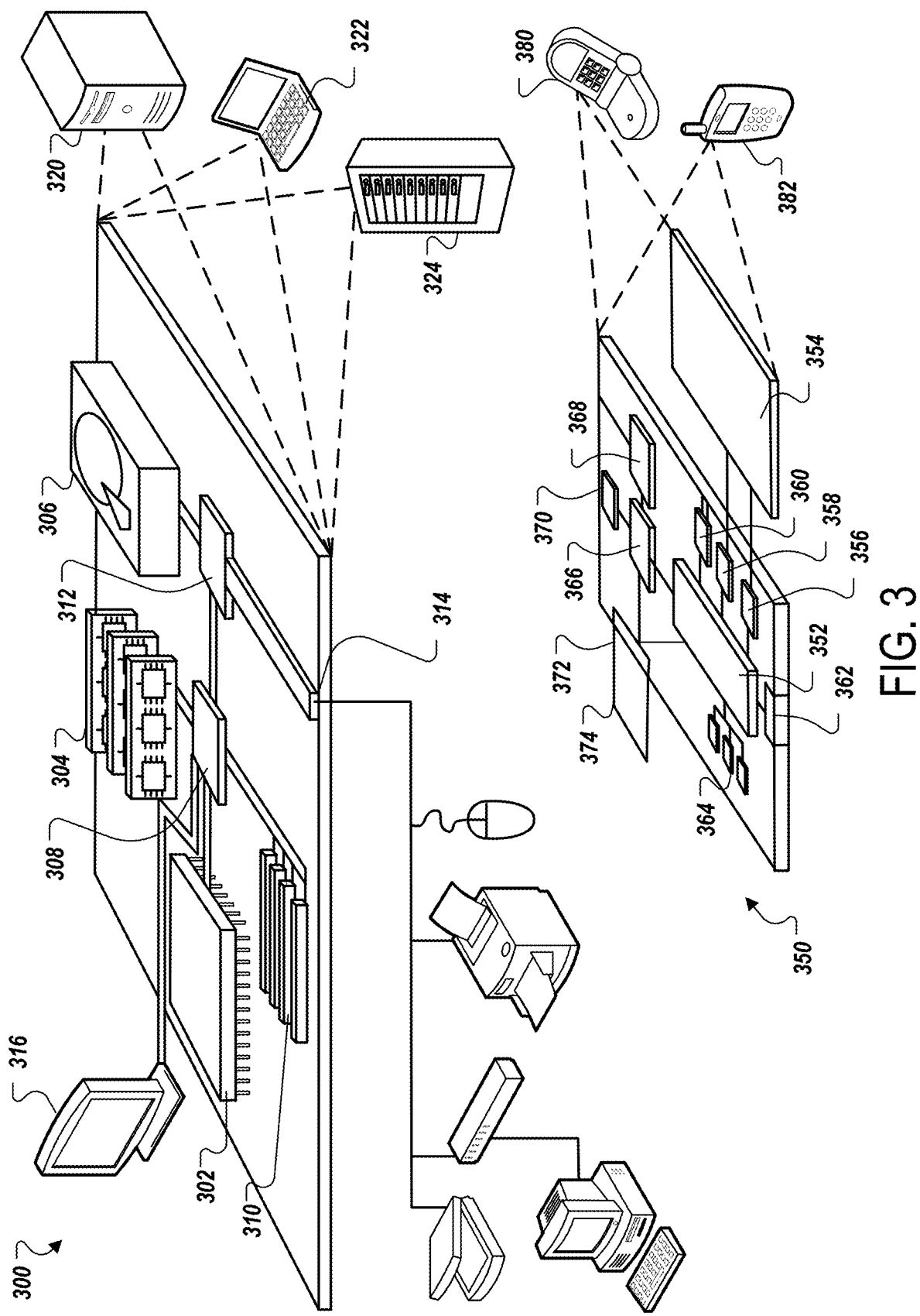

12,438,772 B2

SELF-OPTIMIZING NETWORKS

CROSS-REFERENCE TO RELATED APPLICATION

This application is a continuation of U.S. patent application Ser. No. 18/144,024, filed on May 5, 2023, the contents of which are hereby incorporated by reference.

FIELD

This specification generally relates to a wireless communication systems, and more particularly, a method for optimizing network resources and performance using machine learning.

BACKGROUND

Network computing allows users to request and receive responses for varied requests including requests for data, messaging, calling, among others. Networks require computing resources to provide responses to these requests. Computing resources needs may vary and may cause system failures or increased response delays when computing resources are overloaded.

SUMMARY

Computing resources for implementing large networks—e.g., cloud-based 5G New Radio wireless communication networks—include multiple computing devices servicing requests from users. The requirements of computing resources for implementing such networks can be a function of time, varying, for example, with the volume of requests from users. For example, in a cloud-based implementation of a network, a large number of virtual machines may be needed during a high-traffic period (e.g., during regular work hours on weekdays) to maintain operations of the network. On the other hand, during a period of low-traffic period (e.g., late nights and early mornings and/or weekends), the number of virtual machines to support the network operations can be significantly less than that for the high-traffic period. While maintaining a large amount of computing resources to support the network operations can result in fewer failures or crashes of the system, maintaining and running more computing resources than that required to satisfy user requests can lead to energy wastage, additional pollution from energy production, and faster use-based degradation of some computing resources.

This document describes technology that provides self-regulating networks (also referred to herein as self-optimizing networks) where a machine-learning model is trained to predict usage of computing resources in a given network as a function of time and use those predictions to preemptively adjust the amount of computing resources deployed to administer the network. In this way, the technology described herein can avoid system failures—e.g., network outages resulting from inadequate processing resources—while also avoiding resource/energy wastage by substantially optimizing the amount of computing resources as a function of time. This in turn can also decrease response latency—e.g., latency caused by system crashes or computing resources having to temporarily store requests until sufficient processing resources becomes available—without having to run/maintain redundant computing resources. In general, the self-optimizing or self-regulating networks described herein can provide for dynamically scaling network computing resources substantially in real time in accordance with the demands of the network. Computing resources can be scaled per network, per use case, or per real time traffic, among others. For example, one or more networks running within a larger network can be scaled up or down to optimize the given network. Network resources for a specific use case or type of network usage (e.g., for a given identified user or users or a given identified type of network activity or types of network activity) can similarly be scaled. Optimization can be performed for to scale up or down any number of network computing resources, e.g., for any type of real time traffic received for one or more networks.

Some existing approaches for adjusting computing resources obtain current network usage information and adjust computing resources retroactively—e.g., after failures or other processing issues have been identified. In contrast, the proposed approach preemptively determines where failures are likely to occur and what adjustments can be made to avoid network disruptions resulting from such failures. The proposed approach includes training one or more machine-learning models to predict network behavior. A machine-learning model can be trained to predict specific adjustments—e.g., powering on one or more computers, creating additional virtual machines, among others-based on a current snapshot indicating current network usage. The machine-learning model can be optimized, for example, using feedback based retraining, using subsequently obtained network information indicating, e.g., whether or not a predicted failure and corresponding adjustment successfully alleviated network disruptions.

Advantageous implementations can include one or more of the following features. For example, instead of retroactively addressing inefficiencies due to system failures and delays, the proposed technology can preemptively control computing resources to adjust for predicted demand based on historical data. Techniques described enable the use of historical data-including parameters from performance logs of computing resources, such as processing capacity, utilization, failure rate, processing bandwidth, among others—to train a machine learning model and to use the trained machine learning model to optimize one or more communication networks. By optimizing the computing resources of a communication network, the techniques described in this document, compared to traditional techniques, can help reduce power consumption in the sector, reduce data or voice request failures or blackouts, reduce latency, enable low-latency applications of the communication network, increase lifespan of computing elements, among others.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 3 is a diagram illustrating an example of a computing system used for self-optimizing networks.

Like reference numbers and designations in the various drawings indicate like elements.

DETAILED DESCRIPTION

Figure 1:
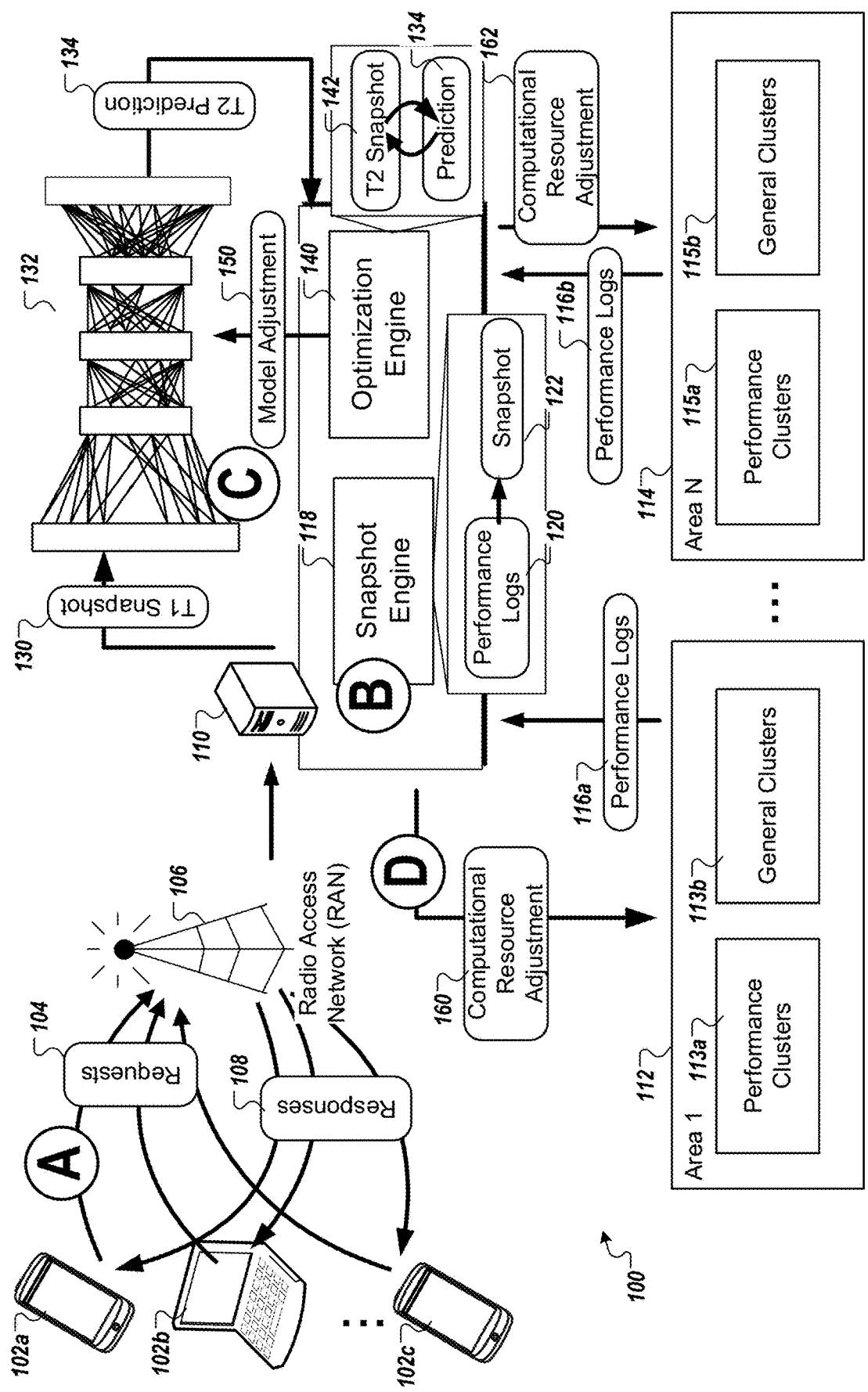
FIG. 1 is a diagram showing an example of a system for self-optimizing networks.

FIG. 1 is a diagram showing an example of a system 100 for self-optimizing networks. The system 100 includes a control unit 110, that may include one or more computing resources, network computing resources in area 1 112 and area N 114. In some implementations, the control unit 110 is realized as a portion of computing capabilities available in a cloud computing system. For example, the portion of computing capabilities available in the cloud computing system can be provided by one or more hardware devices, e.g., in a server rack, configured for computing over a network. In general the control unit 110 can be communicably connected to one or more computing resources. FIG. 1 shows computing resources in area 1 112 and area N 114 for ease of illustration.

The system 100 can include one or more devices 102a-c communicating with a radio access network (RAN). The devices 102a-c can include users requesting network usage for texting, calling, web surfing, among others. The computing resources in area 1 112 and area N 114 can provide computing resources for satisfying and providing responses 108 for the requests 104 from the devices 102a-c.

Computing resources sufficient to respond to the requests 104 can depend on one or more variables, such as time of day, device activity, time of year, among others. Without enough computing resources to compute data for the responses 108, the requests 104 can go un-serviced and users can experience drops in connections among other negative service results. Even without failures, insufficient computing resources can decrease efficiency of providing responses 108 or otherwise servicing the requests 104. Alternatively, spinning up or starting up more computing resources than necessary wastes energy and contributes to increased emissions for the given sector.

The control unit 110 can be configured to dynamically scale computing resources of the system 100—e.g., computing resources in area 1 112 and area N 114—based on predictions generated by machine learning model 132 after the model has been trained over one or more iterations.

Techniques described can be used for particular types of network usage. In some implementations, one or more machine-learning models are trained to use variable parameters—e.g., time of day, location, specific active users, among others—as input in generating subsequent predictions. Where computing resources are provided for a particular use case, a machine-learning model can be trained to scale up and scale down to accommodate normal usage patterns for the particular use case, such as network usage for self-driving car real-world training and corresponding computational processing.

A process of training and then using the trained machine learning model 132 to generate computing resources adjustments 160 and 162 is shown in FIG. 1. FIG. 1 is described in reference to stages A through D of an attendant process which, in some implementations, proceed sequentially from stage A to stage D. In some implementations, one or more stages occur in parallel or in different orders. For example, the machine learning model 132 can be trained before, while, or after requests 104 are obtained at the RAN 106 or the control unit 110 transmits signals corresponding to the computing resources adjustments 160 and 162 to adjust computing resources in area 1 112 and area N 114. In some implementations, processes described in reference to each stage occur in parallel or asynchronously.

In stage A, the RAN 106 services the requests 104 from the devices 102a-c by providing the responses 108 to the devices 102a-c. Compute processes required to provide the responses 108 can be performed by the computing resources in area 1 112 and area N 114 (among other computing resources not shown). Responses 108 can include text data received from one or more other devices interacting with the RAN 106 or another RAN. Responses 108 can include internet access or audio data, among others.

In stage B, the control unit 110 obtains information indicating performance metrics of the computing resources in area 1 112 and area N 114—e.g., performance logs 116a and 116b. As discussed, in general, the system 100 can include one or more computing resources. The control unit 110 can obtain the information from the RAN 106 or directly from one or more devices of the computing resources in area 1 112 and area N 114. The control unit 110 can be communicably connected to both the RAN 106, other RANs not shown, or the computing resources in area 1 112 and area N 114.

In some implementations, the performance logs 116a and 116b include data indicating capacity for central processing unit (CPU) of one or more components, usage utilization, free space memory utilization, among others. The performance logs 116a and 116b can include data indicating performance of one or more computing clusters of the computing resources in area 1 112 and area N 114. For example, the performance logs 116a and 116b can include data indicating performance of the performance clusters 113a of the area 1 112 or the performance clusters 115a of the area N 114. The performance logs 116a and 116b can include data indicating performance of the general clusters 113b of the area 1 112 or the general clusters 115b of the area N 114. Computing clusters of computing resources can include one or more virtual machines, computer hardware processing units, cloud-based processing units, graphics processing units, among others.

In general, the computing resources in area 1 112 and area N 114 can determine, based on a request, current network traffic, a user identifier or device identifier, among others, what computing cluster to use to process a given request. In some implementations, the performance clusters 113a and 115a include higher end hardware that may be more resource-intensive to run. In some implementations, the general clusters 113b and 115b handle all request processing not designated for one or more performance clusters, e.g., the performance clusters 113a and 115a.

A snapshot engine 118 of the control unit 110 generates a snapshot 122 using the performance logs 120. The snapshot 122 can include data indicating network activity, contextual information of a time of day, location, types of users, processing power available or utilized, among others. In some implementations, the control unit 110 operates one or more computing resources that perform processes described in reference to the snapshot engine 118. The processes described in reference to the snapshot engine 118 can be performed on one or more compute resource elements of the control unit 110 or of one or more computing resources communicably connected to the control unit 110.

In some implementations, the snapshot engine 118 generates the snapshot 122 using performance logs 120—e.g., the performance logs 116a and 116b. For example, the control unit 110 can obtain the performance logs 116a and 116b and provide the performance logs 116a and 116b as the performance logs 120 to the snapshot engine 118. The snapshot engine 118, operated by the control unit 110 or by a computing element communicably connected to the control unit 110, can generate the snapshot 122 using the provided performance logs 116a and 116b.

In some implementations, the snapshot 122 includes a subset of one or more values obtained in the performance logs 116a and 116b. For example, the control unit 110 can filter out one or more values of the performance logs 116a and 116b to generate the snapshot 122. The control unit 110 can combine one or more values of the performance logs 116a and 116b to generate the snapshot 122. The control unit 110 can average, or perform one or more other calculations, using one or more values of the performance logs 116a and 116b to generate the snapshot 122.

In stage C, the control unit 110 provides a T1 snapshot 130 to the machine learning model 132. In some implementations, the T1 snapshot 130 includes the snapshot 122 generated by the snapshot engine 118. In some implementations, the T1 snapshot includes data indicating current network activity of the RAN 106 or processing statistics of one or more computing resources—e.g., computing clusters 113a-b and computing clusters 115a-b. In some implementations, the T1 snapshot 130 is generated by the snapshot engine 118 using information representing usage of a wireless network—e.g., requests 104 and responses 108 processed, in part, by one or more computing resources, such as computing resources in area 1 112 and area N 114. In some implementations, the T1 snapshot 130 represents usage of a wireless network, such as the RAN 106 among others, corresponding to a time T1 or time range T1—e.g., of duration 30 seconds, 1 hour, among others.

Stage C of FIG. 1 shows a training process performed by the control unit 110 that includes an optimization engine 140. Operations performed in reference to the optimization engine 140 can be performed by one or more computing elements of the control unit 110.

The control unit 110 provides the T1 snapshot 130 to the machine learning fmodel 132 as input. The machine learning model 132 generates a T2 prediction 134. The T2 prediction 134 can indicate a prediction of the usage of a given wireless network, such as network activity of the RAN 106 or other network elements—at a time corresponding to T2. T2 can be a time after T1. T2 can be a moment in time or a range of time—e.g., 30 seconds, 1 hour, among others.

The control unit 110 can obtain the T2 prediction 134 and provide the T2 prediction 134 to the optimization engine 140. The optimization engine 140, operated by one or more computing elements of the control unit 110 or computing elements communicably connected to the control unit 110, can compare the T2 prediction 134, which can include a prediction of an actual recorded snapshot, with an actual recorded snapshot corresponding to the time T2, e.g., T2 snapshot 142. The T2 snapshot 142 can be generated by the snapshot engine 118 using one or more data from the performance logs 116a and 116b. The T2 snapshot 142 can indicate one or more values of the performance logs 116a and 116b corresponding to the time or time range of T2. The T2 snapshot 142 can be similar to the T1 snapshot 130 in that the T1 snapshot 130 can indicate one or more values of the performance logs 116a and 116b corresponding to the time or time range of T1 and the T2 snapshot 142 can indicate one or more values of the performance logs 116a and 116b corresponding to the time or time range of T2.

In some implementations, the control unit 110 adjusts one or more weights or parameters of the machine learning model 132. For example, the optimization engine 140 can provide the model adjustment 150 to the machine learning model 132. The model adjustment 150 can include one or more model optimization technique, such as backpropagation, adjusting one or more weights or parameters, among others. In general, the model adjustment 150 can reduce one or more values representing a difference between a prediction of the machine learning model 132 and generated snapshots—e.g., one or more difference values indicating a difference between the T2 snapshot 142 and the T2 predictions 134.

In stage D, the control unit 110 provides the computing resources adjustments 160 and 162 to the computing resources in area 1 112 and area N 114. In some implementations, the control unit 110 transmits a signal to the RAN 106 configured to adjust the computing resources in area 1 112 and area N 114. In some implementations, the control unit 110 transmits a signal to the one or more controlling elements of the computing resources in area 1 112 and area N 114, or directly to the computing resources in area 1 112 and area N 114, to adjust the computing resources in area 1 112 and area N 114.

In some implementations, after training the machine learning model 132, the control unit 110 obtains data indicating one or more performance logs, e.g., the performance logs 116a and 116b. The data can indicate performance logs for a time corresponding to T3, subsequent to T2. The control unit 110 can provide one or more value of performance logs corresponding to T3 to the snapshot engine 118 to generate a snapshot T3 (not shown). That snapshot T3 can be provided to the machine learning model 132. The machine learning model 132 can generate a prediction indicating future network usage. In some implementations, the prediction includes a predicted snapshot. The control unit 110 can use a prediction from the machine learning model 132 to generate one or more transmission signals. The transmission signals can be configured to adjust one or more computing resources, such as the computing resources in area 1 112 and area N 114.

In some implementations, the control unit 110 transmits signals to spin up or spin down one or more computing resources. For example, the control unit 110 can transmit a signal configured to spin up or down one or more computing elements of the performance clusters 113a of area 1 112. In response to transmitting the signal—e.g., to the RAN 106 or directly to a controlling device of a computing element of the performance clusters 113a—the one or more computing elements of the performance clusters 113a can spin up or spin down. In this way, the control unit 110 can dynamically scale up or down network computing resources based on predictions of the machine learning model 132.

In some implementations, predictions of the machine learning model 132 include one or more key performance indicators (KPIs). For example, a prediction generated by the machine learning model 132 can include an indication that one or more processes have failed due to insufficient processing power or delay time for processing has exceeded one or more delay thresholds.

In some implementations, the performance logs 116a and 116b indicate performance of both performance and general clusters. Performance and general clusters may provide data at different frequencies—e.g., a performance cluster providing logs every 15 seconds for a previous period of time, such as 15 seconds, and a general cluster providing logs every 60 seconds for a previous period of time, such as 60 seconds. In some implementations, the control unit 110 combines one or more values of obtained performance logs to either generate a snapshot or generate a set of performance logs for generating a snapshot. For example, the control unit 110 can combine 4, or other number, instances of performance cluster performance data with a single instance of general cluster data to account for the difference in reporting frequency.

In some implementations, a generated snapshot, such as the snapshot 122, includes data indicating performance over a period of time equal to an integer multiple of reporting frequency for either a performance or general cluster element. For example, if a reporting frequency of the general clusters 113b is 60 seconds, the snapshot 122 can indicate performance of one or more elements of the general clusters 113b over a period of 60 seconds or an integer multiple of 60 seconds. In general, cluster elements can have any reporting frequency. In some implementations, snapshots are formatted according to particular file format. For example, snapshots can be formatted as JSON files.

In some implementations, one or more resource adjustments generated by the control unit 110 are configured to route one or more processing tasks to one or more computing resources. For example, a prediction of the machine learning model 132 can indicate a future failures for a specific computing element A45k, where "A45k" represents a specific computing resources performing processes to generate one or more data items for one or more of the responses 108. The prediction can be based on, e.g., a number of processing tasks assigned to the computing element A45k at a present point in time or range of time, a time of day, a number of users, or a number of a specific type of user, among other features. One or more features can be captured in performance logs obtained by the control unit 110. The control unit 110 can generate and transmit one or more signals configured to adjust a processing load for the computing element A45k—e.g., by assigning processing tasks to another computing element, powering down the computing element A45k, powering up another computing element with similar characteristics compared to the computing element A45k to be assigned one or more future processing tasks assigned to computing element A45k.

In general, features of performance logs obtained by the control unit 110, such as the performance logs 116a and 116b, can include data indicating one or more requests, such as the requests 104. Features of performance logs can include processing events, failures, or CPU utilization, among others indicating processing of one or more computing resources. The machine learning model 132 can be trained to predict future network behavior or future KPIs based, at least in part, on one or more features of obtained performance logs. Snapshots provided to the machine learning model 132 can include a subset of features indicating one or more values of the performance logs obtained by the control unit 110. Features can also include contextual variables such as time of day—e.g., time of day when performance logs are indicating performance or request data—weather, active users, time of year, holidays, active or scheduled high occupancy users—e.g., users with a predefined minimum of bandwidth or processing power they will require, such as a uniquely identified client using the RAN 106 or other RANs of the system 100 (not shown) to obtain video data for self-driving cars, process, analyze, or perform one or more other network processes—among others.

In some implementations, the machine learning model 132 is trained online—e.g., iteratively after an initial training using real data from user requests, such as requests 104, the RAN 106, or computing clusters 113a-b, 115a-b, among others. For example, the machine learning model 132 can be optimized by the optimization engine 140 after an initial one or more rounds of training or before one or more rounds of training. In some implementations, the optimization engine 140 obtains data indicating the computing resources adjustments generated by the control unit 110. The optimization engine 140 can generate one more adjustments—e.g., the model adjustment 150—to change one or more subsequent predictions of the machine learning model 132 based on adjustments provided by the control unit 110 successfully averting one or more negative predicted KPIs or not successfully averting one or more negative predicted KPIs. For example, if resource adjustments generated by the control unit 110 to prevent a computing element from failing did not, as shown by subsequent performance logs analyzed by the optimization engine 140 obtained by the control unit 110, prevent the computing element from failing, the optimization engine 140 can apply a model adjustment 150 to adjust one or more KPIs or other predictions generated by the machine learning model 132.

In some implementations, the machine learning model 132 generates one or more suggested resource adjustments. For example, the control unit 110 can provide a snapshot, such as the snapshot 130. The machine learning model 132 can generate a prediction that indicates a predicted resource adjustment, e.g., the T2 prediction 134. The predicted resource adjustment can be based on averting one or more negative KPIs, such as element failures, network delays, among others. Network adjustments can include starting or initiating computing resources, turning off or deleting resources, changing an allocation of processing tasks, changing an allocation of performance tasks to general or vice versa, among others.

In some implementations, the machine learning model 132 is trained to predict anomalies or malfunctions within one or more computing elements before the anomalies or malfunctions occur. For example, the machine learning model 132 can predict an anomaly or malfunction and then the control unit 110 can obtain the prediction, e.g., the prediction 134, and compare it with actual data generated for the same corresponding period to determine if an anomaly or malfunction was correctly or incorrectly predicted by the machine learning model 132. If a prediction was correct, the optimization engine 140 can adjust the machine learning model 132 to reward one or more layers of the machine learning model 132 to incentivize the same predictions based on the same input in the future. If a prediction was not correct, the optimization engine 140 can adjust the machine learning model 132 to penalize one or more layers of the machine learning model 132 to reduce a likelihood of the same predictions based on the same input in the future.

In some implementations, preemptively spinning up or spinning down computing elements proactively can help avoid system failures. Spinning up or spinning down—e.g., turning on or turning off computing elements—can take time. If not done proactively, the time taken to spin up or spin down a computing element can cause extended failures or waste resources and increase associated energy use and emissions.

In some implementations, the machine learning model 132 includes a bi-directional Long Short Term Memory Networks (LSTM) autoencoder. In some implementations, a LSTM can be used for one or more input types of the machine learning model 132. In some implementations, a LSTM can be used to provide input for one or more subsequent layers of the machine learning model 132.

In some implementations, the machine learning model 132 predicts one or more of CPU utilization, memory utilization, or network total bytes. The machine learning model 132 can predict according to a given time domain, e.g., T1, T2, T3, among others, indicating a specific time or a range of time. Features such as CPU utilization, memory utilization, or network total bytes, among others, can be indicated in generated snapshots. Features such as CPU utilization, memory utilization, or network total bytes, among others, can be indicated in one or more performance logs obtained by the control unit 110, e.g., the performance logs 116a and 116b.

In some implementations, the control unit 110 iteratively selects features included in one or more performance logs for input to the machine learning model 132. For example, the control unit 110 can iteratively select different sets of features to provide to the machine learning model 132 based on obtained performance logs. Different features can affect corresponding predictions generated by the machine learning model 132. Features provided by the control unit 110 to the machine learning model 132, e.g., in a snapshot, such as the snapshot 130, can be optimized in a process of optimizing the machine learning model 132. In some implementations, the control unit 110 scores features based on their impact on a prediction to determine what features correspond to accurate predictions and what features corresponding to not accurate or inaccurate predictions. In some implementations, the machine learning model 132 generates predictions indicating network events for a period of time in the future, such as 1 minute, or one day.

Figure 2:
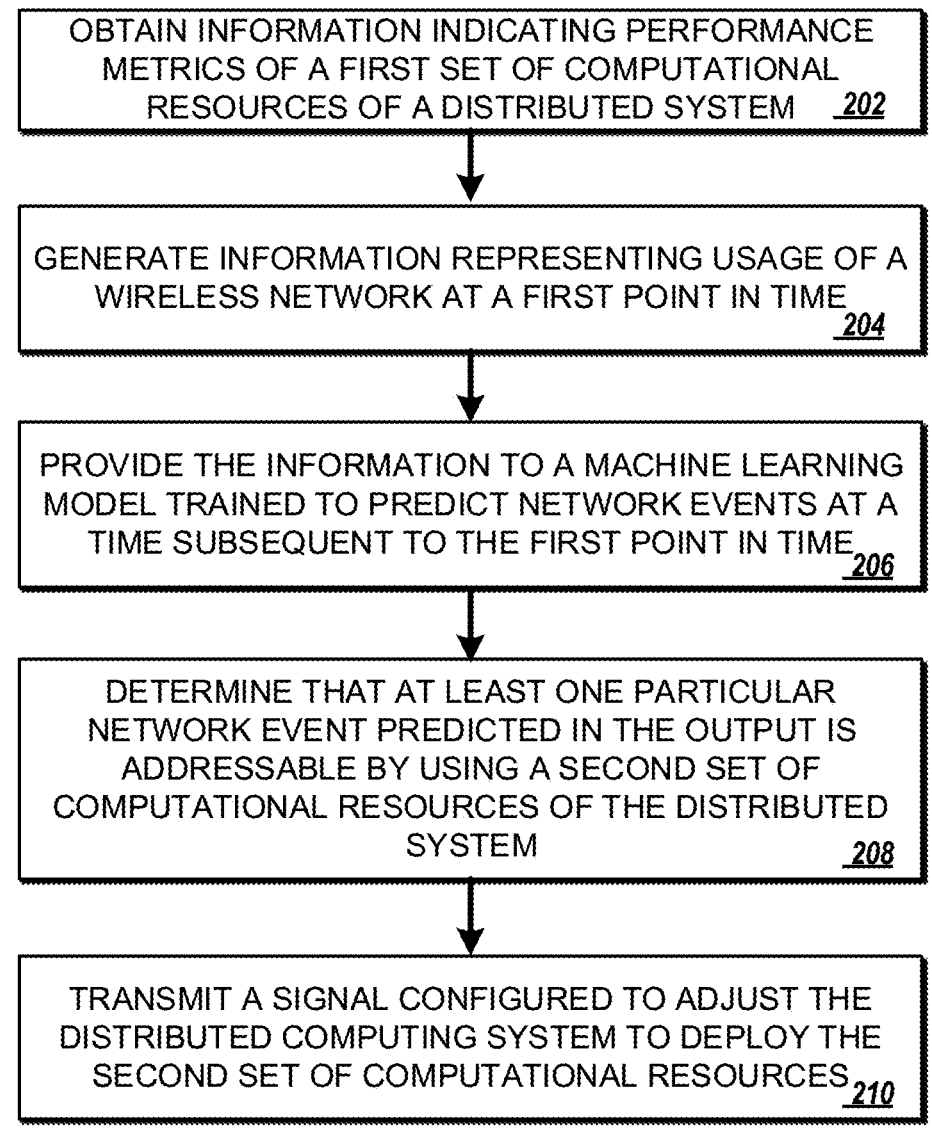
FIG. 2 is a flow diagram illustrating an example of a process for self-optimizing networks.

FIG. 2 is a flow diagram illustrating an example of a process 200 for self-optimizing networks. The process 200 may be performed by one or more electronic systems, for example, the system 100 of FIG. 1.

The process 200 includes obtaining information indicating performance metrics of a first set of computing resources of a distributed system (202). For example, the control unit 110, as described in reference to FIG. 1, can obtain the performance logs 116a and 116b. The control unit 110 can obtain the performance logs 116a and 116b from the RAN 106 or the computing resources in area 1 112 and area N 114.

In some implementations, the information indicating performance metrics of the first set of computing resources includes one or more performance logs of the first set of computing resources. For example, the first set of computing resources can include one or more hardware computing elements of the performance clusters 113a, the performance clusters 115a, the general clusters 113b, or the general clusters 115b.

In some implementations, the one or more performance logs include one or more values indicating processing unit capacity, processing unit usage, available bandwidth, or utilization of the first set of one or more computing resources.

The process 200 includes generating information representing usage of a wireless network at a first point in time (204). For example, the control unit 110, described in reference to FIG. 1, can provide data of one or more performance logs as the performance logs 120 (e.g., a subset of the obtained performance logs 116a-b) to the snapshot engine 118. The snapshot engine 118 can generate the snapshot 122 indicating usage of a wireless network—e.g., requests 104, responses 108, and associated processes—for a given point in time or over a time range.

In some implementations, generating the information representing usage of the wireless network at the first point in time includes selecting a subset of values included in the information indicating performance metrics of the first set of computing resources to be included in the information representing usage of the wireless network at the first point in time. For example, the control unit 110 can select a subset of values of the performance logs 116a and 116b to be included in the snapshot 122. In some implementations, combinations, new generated values by the control unit 110, or other values corresponding to one or more values of the performance logs 116a and 116b can be included by the control unit 110 in the snapshot 122.

The process 200 includes providing the information to a machine learning model trained to predict network events at a time subsequent to the first point in time (206). For example, the control unit 110 can provide the snapshot 130 to the machine learning model 132.

The process 200 includes determining that at least one particular network event predicted in the output is addressable by using a second set of computing resources of the distributed system (208). For example, the control unit 110 can obtain the prediction 134 and determine, using the prediction 134, a particular network event that will occur in the future, with a corresponding likelihood.

In some implementations, the particular network event includes a future failure of a first computation resource of the first set of one or more computing resources and the signal configured to adjust the distributed computing system to deploy the second set of computing resources includes instructions for a second computing resources of the first set of one or more computing resources to handle requests previously scheduled to be handled by the first computing resources.

The process 200 includes transmitting a signal configured to adjust the distributed computing system to deploy the second set of computing resources (210). For example, the control unit 110 can generate and transmit the computing resources adjustments 160 and 162 to adjust the computing resources in area 1 112 and area N 114. The control unit 110 can transmit the signal included data of the computing resources adjustments 160 and 162 to the RAN 106 or other RAN or the computing resources in area 1 112 and area N 114 or corresponding control units of the computing resources in area 1 112 and area N 114.

In some implementations, the signal configured to adjust the distributed computing system to deploy the second set of computing resources includes instructions for a computing resources of the first set of one or more computing resources to power on or power off. For example, the control unit 110 can generate and transmit a signal configured to spin up or spin down a computing element of the performance clusters 113a.

In some implementations, the signal configured to adjust the distributed computing system to deploy the second set of computing resources includes instructions for a computing resources of the first set of one or more computing resources to generate a replicated instance of a virtual machine for processing requests of a first type. For example, requests of a first type can include data requests, text requests, audio requests, among others. Virtual machines can be operated by one or more computing elements of the computing resources in area 1 112 and area N 114. Data of the responses 108 can be generated by one or more virtual machines.

In some implementations, the output from the machine-learning model indicates an increase of the requests of the first type at a time subsequent to the first point in time. For example, the prediction 134 can indicate that requests for data in the network of the RAN 106 will increase at a time or in a time period of the future. The control unit 110 can use the data of the prediction 134 to generate an adjustment to adjust one or more computing resources of the system 100.

In some implementations, advantageous implementations include providing multiple parameters for adjustment by a trained model. For example, the control unit 110 can obtain one or more parameters of a network, such as radio tower angles, processing resource allocation, network functions (e.g., specific CNFs), among others. The machine learning model 132 can adjust one or more parameters obtained by the control unit 110. In some implementations, the control unit 110 receives signals indicating a current value corresponding to a parameter. The current value can be provided to the machine learning model 132. The machine learning model 132 can output a new value or adjustment to the current value. The control unit 110 can transmit a signal to one or more connected components configured to adjust one or more parameters (e.g., adjust a radio tower angle, adjust resource allocation, network functions, among others).

In some implementations, parameters are adjusted to use data centers that are closer or further away from a given connected device in a network. For example, the machine learning model 132 can adjust parameters controlling how computations are allocated to computing elements. Adjusting parameters can adjust a ratio of computations performed within a threshold distance from a given requesting user or data source compared to computations performed outside the threshold distance.

In some implementations, some parameters are especially important for particular user services. For example, for network processing arising from moving objects (e.g., tractors roaming on a field requiring GPS navigation processing or other processing, cars driving using autonomous or semi-autonomous features, among others) may be affected more by radio tower angle adjustments compared to other network processing tasks, e.g., for objects that are not moving or not moving as much. In some implementations, the machine learning model 132 adjusts one or more parameters—e.g., parameters for tower angle adjustments, or other parameter(s) of importance. The machine learning model 132 can adjust parameters, as discussed in this document, based on one or more rounds of training, e.g., using training data sets that indicate a strong cause and effect relationship between one or more parameters and network performance for a given use case.

In some implementations, all, or substantially all, parameters of a network are parametrized and available to the machine learning model 132 for adjustment. Traditional approaches for parameter tuning can require manual adjustment. Such manual adjustment can also be limited in scope to only a few parameters, e.g., available in a given interface. In contrast, techniques described in this document can enable simultaneous or serial adjustments for one or more parameters by the machine learning model 132 across all, or substantially all, parameters that control network processing in a network. In this way, all, or substantially all, parameters can be exposed to achieve increased efficiency and accuracy of the network based on adjustments by the control unit 110 and the machine learning model 132.

In some implementations, the control unit 110 can adjust parameters across network stages. For example, the machine learning model 132 can determine one or more adjustments for radios of a network, fiber of a network, routers of a network, cloud elements, among others. Adjustment can occur simultaneously or serially across various interfaces, e.g., the radios of a network, fiber of a network, routers of a network, cloud elements, among others.

In some implementations, parameters are adjusted based on user or use case. For example, based on how a user uses a network, the machine learning model 132 can adjust one or more network parameters. A self-driving car use case may require significant computation to be performed close to driving cars but only at specific times of the day. The machine learning model 132 can adjust one or more network parameters based on past usage data of a given user (e.g., identified by one or more user identifiers or types of signals detected in the given network). Such adjustments can be informed by one or more rounds of training (e.g., which can include using training data that features data processing of the given user). In this way, instead of providing blanket features that are constant across users, the techniques described in this document can enable user specific network processing that, e.g., reduces overall network capacity requirements and energy usage while increasing efficiency and processing performance.

FIG. 3 is a diagram illustrating an example of a computing system used for self-optimizing networks. The computing system includes computing device 300 and a mobile computing device 350 that can be used to implement the techniques described herein. For example, one or more components of the system 100 could be an example of the computing device 300 or the mobile computing device 350, such as a computer system implementing the control unit 110, devices that access information from the control unit 110, or a server that accesses or stores information regarding the operations performed by the control unit 110. In some implementations, one or more devices 102a-c include internet of things (IoT) devices. For example, the one or more devices 102a-c can include smart devices, e.g., in a car, home, or otherwise available to users for interacting over a network.

The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 302 is a single threaded processor. In some implementations, the processor 302 is a multi-threaded processor. In some implementations, the processor 302 is a quantum computer.

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine readable mediums (for example, the memory 304, the storage device 306, or memory on the processor 302). The high-speed interface 308 manages bandwidth-intensive operations for the computing device 300, while the low-speed interface 312 manages lower bandwidth-intensive operations. Such allocation of functions is an example only. In some implementations, the high speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device, such as a mobile computing device 350. Each of such devices may include one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may include appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry in some cases. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 368 using a radio frequency. In addition, short-range communication may occur, such as using a Bluetooth, Wi-Fi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, among others) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
   obtaining, from a distributed computing system servicing requests from user devices of a wireless network, information indicating performance metrics of a first set of computing resources of the distributed computing system;
   generating, based on the information indicating performance metrics of the first set of computing resources, information representing usage of the wireless network at a first point in time;
   providing the information representing usage of the wireless network to a machine-learning model to predict, based on usage data, network events at a time subsequent to the first point in time;
   generating, based on the information indicating performance metrics of the first set of computing resources, second information representing usage of the wireless network at the time subsequent to the first point in time;
   comparing output of the machine-learning model and the second information;
   determining, based on the comparison, whether one or more predicted network events are represented in the second information; and
   adjusting, responsive to determining whether the one or more predicted network events are represented in the second information, the machine-learning model.

2. The method of claim 1, wherein the information indicating performance metrics of the first set of computing resources comprises one or more performance logs of the first set of computing resources.

3. The method of claim 2, wherein the one or more performance logs include one or more values indicating processing unit capacity, processing unit usage, available bandwidth, or utilization of the first set of one or more computing resources.

4. The method of claim 1, wherein generating the second information representing usage of the wireless network at the time subsequent to the first point in time comprises:
   selecting a subset of values included in the information indicating performance metrics of the first set of computing resources to be included in the second information representing usage of the wireless network at the time subsequent to the first point in time.

5. The method of claim 1, wherein the one or more predicted network events include a future failure of a first computation resource of the first set of one or more computing resources.

6. The method of claim 1, comprising:
   determining, based on an output of the machine-learning model, that at least one particular network event predicted in the output is addressable by using a second set of computing resources of the distributed computing system, the second set of computing resources being different from the first set of computing resources; and
   transmitting, responsive to determining that the at least one particular network event is addressable using the second set of computing resources, a signal configured to adjust the distributed computing system to deploy the second set of computing resources.

7. The method of claim 6, wherein the signal configured to adjust the distributed computing system to deploy the second set of computing resources comprises instructions for a computing resource of the first set of one or more computing resources to power on or power off.

8. The method of claim 6, wherein the signal configured to adjust the distributed computing system to deploy the second set of computing resources comprises instructions for a computing resource of the first set of one or more computing resources to generate a replicated instance of a virtual machine for processing requests of a first type.

9. The method of claim 8, wherein the output from the machine-learning model indicates an increase of the requests of the first type at a time subsequent to the first point in time.

10. The method of claim 6, wherein the output of the machine-learning model indicates that a first computing resource is likely to fail in the future and wherein the signal configured to adjust the distributed computing system to deploy the second set of computing resources comprises instructions for a second computing resources of the first set of one or more computing resources to handle requests previously scheduled to be handled by the first computing resource.

11. One or more computer-readable storage media encoded with instructions that, when executed by one or more computers, cause the one or more computers to perform operations comprising:

obtaining, from a distributed computing system servicing requests from user devices of a wireless network, information indicating performance metrics of a first set of computing resources of the distributed computing system;

generating, based on the information indicating performance metrics of the first set of computing resources, information representing usage of the wireless network at a first point in time;

providing the information representing usage of the wireless network to a machine-learning model to predict, based on usage data, network events at a time subsequent to the first point in time;

generating, based on the information indicating performance metrics of the first set of computing resources, second information representing usage of the wireless network at the time subsequent to the first point in time;

comparing output of the machine-learning model and the second information;

determining, based on the comparison, whether one or more predicted network events are represented in the second information; and adjusting, responsive to determining whether the one or more predicted network events are represented in the second information, the machine-learning model.

12. The media of claim 11, wherein the information indicating performance metrics of the first set of computing resources comprises one or more performance logs of the first set of computing resources.

13. The media of claim 12, wherein the one or more performance logs include one or more values indicating processing unit capacity, processing unit usage, available bandwidth, or utilization of the first set of one or more computing resources.

14. The media of claim 11, wherein generating the second information representing usage of the wireless network at the time subsequent to the first point in time comprises:

selecting a subset of values included in the information indicating performance metrics of the first set of computing resources to be included in the second information representing usage of the wireless network at the time subsequent to the first point in time.

15. The media of claim 11, wherein the one or more predicted network events include a future failure of a first computation resource of the first set of one or more computing resources.

16. The media of claim 11, wherein the operations comprise:

determining, based on an output of the machine-learning model, that at least one particular network event predicted in the output is addressable by using a second set of computing resources of the distributed computing system, the second set of computing resources being different from the first set of computing resources; and transmitting, responsive to determining that the at least one particular network event is addressable using the second set of computing resources, a signal configured to adjust the distributed computing system to deploy the second set of computing resources.

17. The media of claim 16, wherein the signal configured to adjust the distributed computing system to deploy the second set of computing resources comprises instructions for a computing resource of the first set of one or more computing resources to power on or power off.

18. The media of claim 16, wherein the signal configured to adjust the distributed computing system to deploy the second set of computing resources comprises instructions for a computing resource of the first set of one or more computing resources to generate a replicated instance of a virtual machine for processing requests of a first type.

19. The media of claim 18, wherein the output from the machine-learning model indicates an increase of the requests of the first type at a time subsequent to the first point in time.

20. A system comprising:

one or more computers and one or more storage devices on which are stored instructions that are operable, when executed by the one or more computers, to cause the one or more computers to perform operations comprising:

obtaining, from a distributed computing system servicing requests from user devices of a wireless network, information indicating performance metrics of a first set of computing resources of the distributed computing system;

generating, based on the information indicating performance metrics of the first set of computing resources, information representing usage of the wireless network at a first point in time;

providing the information representing usage of the wireless network to a machine-learning model to predict, based on usage data, network events at a time subsequent to the first point in time;

generating, based on the information indicating performance metrics of the first set of computing resources, second information representing usage of the wireless network at the time subsequent to the first point in time;

comparing output of the machine-learning model and the second information;

determining, based on the comparison, whether one or more predicted network events are represented in the second information; and adjusting, responsive to determining whether the one or more predicted network events are represented in the second information, the machine-learning model.

* * * * *